United States Patent
Schwerdhoefer

[11] Patent Number: 5,190,500
[45] Date of Patent: Mar. 2, 1993

[54] CHAIN THROWER MECHANISM FOR BICYCLE GEAR CHANGE

[75] Inventor: Hans J. Schwerdhoefer, Schweinfurt, Fed. Rep. of Germany

[73] Assignee: Fichtel & Sachs AG, Schweinfurt, Fed. Rep. of Germany

[21] Appl. No.: 773,108

[22] Filed: Oct. 8, 1991

[30] Foreign Application Priority Data

Oct. 9, 1990 [DE] Fed. Rep. of Germany ....... 4031983

[51] Int. Cl.⁵ ............................................. F16H 59/00
[52] U.S. Cl. ...................................... 474/80; 474/101; 280/261
[58] Field of Search ........................... 474/101, 78-83, 474/150, 161-163; 280/238, 261

[56] References Cited

U.S. PATENT DOCUMENTS

| | | | |
|---|---|---|---|
| 3,910,136 | 10/1975 | Juy | 474/82 X |
| 3,960,025 | 6/1976 | Juy | 474/82 |
| 4,073,610 | 2/1978 | Cox | 425/577 |
| 4,857,036 | 8/1989 | Romano | 474/80 |
| 5,013,285 | 5/1991 | Carlyle | 474/80 |

FOREIGN PATENT DOCUMENTS

| | | |
|---|---|---|
| 1246447 | 8/1967 | Fed. Rep. of Germany . |
| 1605784 | 4/1971 | Fed. Rep. of Germany . |
| 2153008 | 5/1973 | Fed. Rep. of Germany . |
| 1505949 | 8/1973 | Fed. Rep. of Germany . |
| 2520693 | 8/1983 | France ................................... 474/80 |
| 2539096 | 7/1984 | France . |
| 1346892 | 2/1974 | United Kingdom . |

Primary Examiner—Terry Lee Melius
Assistant Examiner—Roger J. Schoeppel
Attorney, Agent, or Firm—Brumbaugh, Graves, Donohue & Raymond

[57] ABSTRACT

In a chain thrower mechanism of a bicycle dérailleur gear mechanism a parallelogram linkage is formed from plastics material at least part of the joints of which are plastic film hinges.

36 Claims, 2 Drawing Sheets

CHAIN THROWER MECHANISM FOR BICYCLE GEAR CHANGE

BACKGROUND OF THE INVENTION

This invention relates to a chain thrower mechanism for gear change operations in a bicycle In bicycles a gear change can be effected by dislocating the bicycle chain between chain sprockets of different teeth number and different size, which sprockets are connected for common rotation either with a pedalling shaft of the respective bicycle or with a driver member of the rear-wheel of the respective bicycle.

Such chain thrower mechanisms generally comprise two terminal members, namely a frame side terminal member adapted to be fastened on a bicycle frame, and a thrower side terminal member adapted to be assembled with a chain thrower unit, and further comprise at least one connecting member hingedly connected with both said terminal members for guiding said thrower side terminal member along a predetermined path with respect to said frame side terminal member. This chain thrower unit is adapted for engagement with a bicycle chain and for dislocating this bicycle chain between at least two chain sprockets in response to movement of the thrower side terminal member along said predetermined path.

In most cases the chain thrower mechanism comprises two connecting members which form together with the terminal members an articulated parallelogram arrangement.

STATEMENT OF THE PRIOR ART

From a periodical "Radmarkt" 9/1984, page 142, it is known to produce certain components of a gear change mechanism chain from plastics materials such as Delrin 500 by injection moulding.

From the published German patent application 1 246 447 and the respective patents of addition 1 505 949 and 1 605 784 it is further known that certain components of a chain thrower mechanism can be manufactured from plastics material. In these publications the joints between adjacent components of the chain thrower mechanism are well-established joints composed of separately manufactured bolt-and-eye components.

All known chain thrower mechanisms including those which comprise plastics components have the drawback of high manufacturing costs. These manufacturing costs are considerably influenced by the assembly of the prefabricated components of the chain thrower mechanism. It has been tried to create automatic assembly machines for assembling these components. Such automatic assembling machines, however, involve very high investment costs and, nevertheless, do not avoid a considerable amount of human labour.

OBJECT OF THE INVENTION

It is a primary object of the invention to create a mechanism which can be manufactured with reduced costs of involved human labour and reduced costs of automatic assembling appliances.

A further object of the invention is to provide a chain thrower mechanism which is highly precise as to its guiding function. A still further object is to obtain a chain thrower mechanism having a reduced weight. Further, it is an object of the invention to obtain a chain thrower mechanism which is less liable to wear during its useful life. A further object is to facilitate the manufacturing of various components of a chain thrower mechanism with different colours in view of an attractive appearance of the mechanism.

SUMMARY OF THE INVENTION

In order to achieve at least part of the above-mentioned objects, a chain thrower mechanism for gear change in a bicycle is proposed. The chain thrower mechanism comprises two terminal members, namely a frame side terminal member adapted to be fastened on a bicycle frame and a thrower side terminal member adapted to be assembled with a chain thrower unit and further comprises at least one connecting member hingedly connected with both the terminal members for guiding the thrower side terminal member along a predetermined path with respect to the frame side terminal member. The chain thrower unit is adapted for engagement with a bicycle chain and for dislocating the bicycle chain between at least two chain sprockets in response to movement of the thrower side terminal member along the predetermined path. At least one articulated component assembly of the chain thrower mechanism comprises at least two components, one of which is at least a part of one of the terminal members and another one of which is at least a part of a connecting member. These at least two components are articulated with respect to each other by a joint having a joint axis.

The at least two components are integrally moulded from plastics material. The joint between these two components is formed as a weakened portion of plastics material interconnecting the two components.

Such at least one joint can be most simply produced integrally with the adjacent components by a single moulding operation. The stability of the chain thrower mechanism will be sufficient even if all joints are manufactured as such weakened portions. For obtaining such stability, one can select the necessary height of the weakened hinge portions in accordance with the load to be expected in operation and with the physical properties of the materials used.

At least one articulated component assembly may be moulded from thermoplastic material, for example, by injection moulding. The at least one joint may be shaped as a plastic film hinge. In order to obtain a highly stable structure of the chain thrower mechanism, it is of importance that the weakened portion be reduced to a short section of the connecting portion connecting adjacent components so that the joint axis is precisely positioned at the location of maximum weakness. The weakened portion may be secured against tearing by at least one moulded-in stress-relief radius. Such moulded-in stress-relief radii are preferably provided at both end portions of the weakened portion which are spaced from each other along the joint axis.

The articulated component assembly may be reinforced at least in an area adjacent the weakened portion by reinforcement fibres embedded in the plastics material. The reinforcement fibres may be selected from the group of carbon fibres and glass fibres. The reinforcement fibres may form a fibre mat or may be individual chopped fibre sections.

At least one of the components may be integrally moulded with an auxiliary element such as a Bowden-wire anchoring element, a Bowden-tube support element, a spring element, or a fixing element for fixing such a spring element. The at least two components of the at least one articulated component assembly may be made of differently coloured plastics materials. This is possible due to the throttling effect resulting from the gap of a mould cavity which gap corresponds to the weakened portion. If differently coloured materials are injected into the mould cavity areas on both sides of the gap, there will be substantially no mixing of the moulding materials on both sides of the gap.

According to a preferred embodiment of the invention, the terminal members and two connecting members form a quadrangle. This quadrangle may be approximately a parallelogram. In such a quadrangle, more than two joints of said quadrangle may be shaped as weakened portions interconnecting mutually adjacent members of the quadrangle.

In particular, all four joints of the quadrangle may be shaped as weakened portions between respective mutually adjacent members of the terminal members and the connecting members.

If it is intended to provide all four joints by weakened portions, it will be possible that the quadrangle is integrally shaped as a closed annulus. This is the most economic way of manufacturing the quadrangle per se.

In consideration of the necessity of assembling the quadrangle with auxiliary elements and also in consideration of the necessity of giving complicated shapes to at least part of the members of the quadrangle, it may be helpful if the terminal members and the connecting members of the quadrangle are integrally coherently shaped in a substantially linear sequence and are closed subsequently by closure means. These closure means may be substantially rigid closure means provided between adjacent partial members of one member of the terminal members and the interconnecting members. Preferably, the substantially rigid closure means are provided adjacent a respective joint formed by a weakened portion.

Alternatively, the closure means may be articulated closure means provided by a composed joint, which composed joint may be composed of interengaging hinge portions of adjacent members.

According to a further embodiment three mutually adjacent members of the terminal members and the connecting members of the quadrangle are integrally coherently shaped with two weakening portions therebetween, and a fourth one of these members is connected to two members of the three members by two composed joints. More particularly, the three integrally coherently shaped members comprise one of the terminal members and two connecting members, whereas the fourth member is a further terminal member.

According to a still further embodiment, the quadrangle comprises two articulated component assemblies, each of which comprises one complete member and two adjacent partial members integral with the complete member. Respective partial members are interconnected with each other by substantially rigid closure means. The substantially rigid closure means may be welded or adhesively bonded closure means. Preferably, ultrasonic welding is used. Alternatively or additionally, the substantially rigid closure means may be provided by interengaging complementary closure porttions of respective interconnected partial members of at least one of the terminal members and connecting members. These complementary closure portions may be dove-tail shaped.

If a rigid closure is provided, an auxiliary element may be positioned adjacent the closure means by mutually interconnected partial members of the respective member. For example, a spring member may be located at the location of the closure means.

Besides one or more joints formed as weakened portions, one or more joints may be composed by mutually engaged hinge portions of two mutually adjacent members.

According to a preferred embodiment of such a composed joint, one of the mutually engaged hinge portions is a partially cylindrical groove extending along the respective joint axis and the other one of the mutually engaged hinge portions is a partially cylindrical rib extending along the respective joint axis and is engaged with said partially cylindrical groove. The rib and the groove should be secured with respect to each other along the joint axis. For example, the groove and the rib may be secured with respect to each other along the joint axis by mutually engaged annular complementary securing faces provided in the groove and on the rib, respectively, and extending around the joint axis. These securing faces may be engaged by snap-action when inserting the cylindrical rib into the cylindrical groove along the joint axis. It is, however, also possible that the cylindrical groove and the cylindrical rib are combined in radial direction with respect to the joint axis, possibly after weakening of the groove portion by heating thereof.

The various features of novelty which characterize the invention are pointed out with particularity in the claims annexed hereto and forming a part of the disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

The invention will be explained in greater detail hereinafter with reference to embodiments shown in the accompanying drawings in which.

DETAILED DESCRIPTION OF THE PREFERRED EMBODIMENTS

Figure 1:
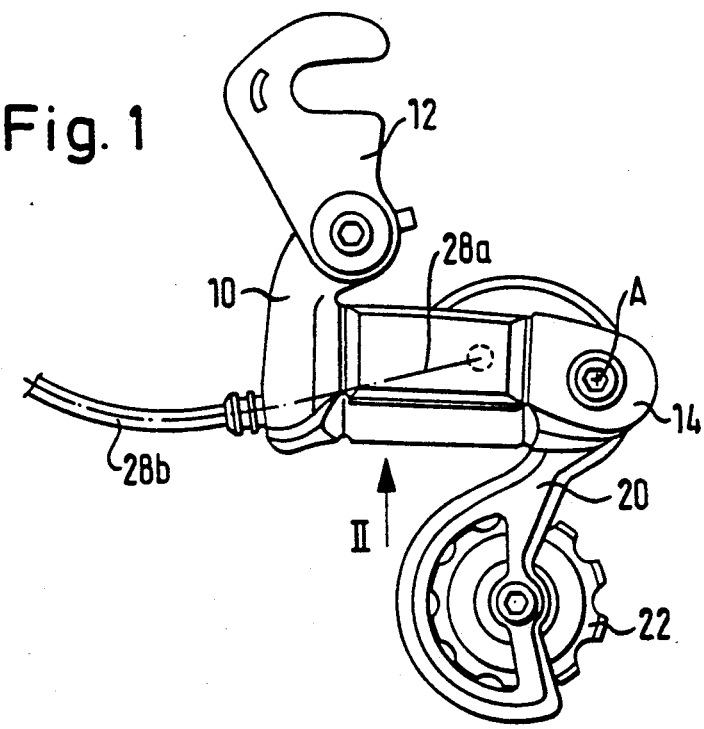
FIG. 1 shows a perspective view of a chain thrower mechanism of a bicycle.
Figure 2:
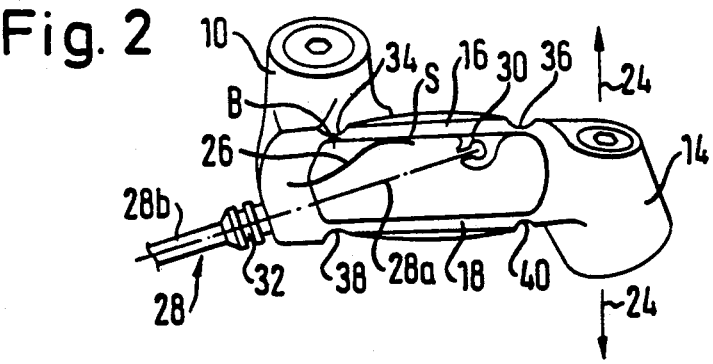
FIG. 2 shows an end view of the mechanism of FIG. 1 according to arrow II of FIG. 1.

The chain thrower mechanism of FIGS. 1 and 2 comprises a frame side terminal member 10 connected to a hook 12. The hook 12 is adapted to be fastened to a bicycle frame (not shown). The frame side terminal member 10 is connected to a thrower side terminal member 14 by two connecting members 16 and 18. A chain thrower unit 20 is fastened to the terminal member 14 and is pivotable with respect to the terminal member 14 about an axis A. The chain thrower unit 20 comprises two chain wheels one of which is shown and designated by 22. These two chain wheels engage the bicycle chain (not shown). For tensioning the bicycle chain biasing means act on the chain thrower unit 20 exerting torque thereon about the axis A.

The members 10, 14, 16, and 18 form an articulated parallelogram which guides the thrower side terminal member 14 along a path 24. By movement of the thrower side terminal member 14 along the path 24, the bicycle chain can be located on different chain sprockets (not shown) which are fastened to a driver of a rearward bicycle hub. A leaf spring 26 biases the parallelogram toward a position in which the chain is engaged with one terminal chain sprocket of a group of axially spaced chain sprockets. The chain can be engaged with adjacent other sprockets by deformation of the parallelogram against the action of the leaf spring 26. This deformation is caused by a Bowden cable 28, the core wire 28a of which is attached to an anchoring piece 30 integrally formed with the connecting member 16. The tube 28b of the Bowden cable is supported by a support sleeve 32 which may be integrally formed with the frame side terminal member 10.

Figure 7:
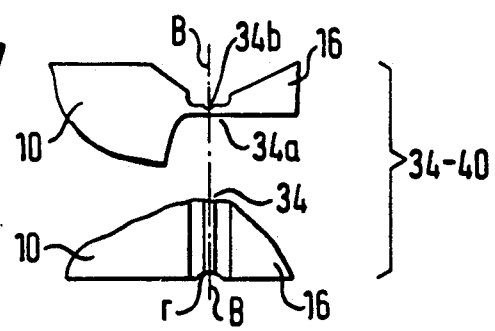
FIG. 7 shows a plastic film hinge as used in the embodiments of FIGS. 2, 3, 4, and 5.

The members 10, 14, 16, and 18 are integrally formed with plastic film hinges 34, 36, 38, 40 therebetween. One of these plastic film hinges 34-40 is shown in detail in FIG. 7. Such a plastic film hinge comprises a weakened portion 34a with a central weakening groove 34b. The upper illustration of FIG. 7 is a section perpendicular to a joint axis B—B which is also shown in FIG. 2. It is to be noted that all transient radii as shown in the upper illustration of FIG. 7 are smooth, sharp edges being avoided. Moreover—as can be seen from the lower illustration of FIG. 7—the weakened portions 34a also have stress-relief radii at the ends thereof spaced along the joint axis B—B.

The weakening groove 34b provides a precise position of the joint axis B—B.

Figure 3:
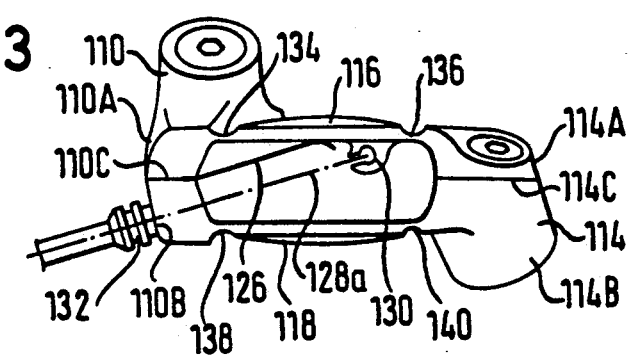
FIG. 3 shows a modified embodiment as compared with FIG. 2.

In FIG. 3, the terminal members 110 and 114 are composed of partial members 110A, 110B, and 114A, 114B which are composed along faces 110C and 114C, respectively. The partial members 110A and 110B may be composed by adhesive bonding or by ultrasonic welding. The plastic film hinges 134, 136, 138, 140 are shaped as shown and described with respect to FIG. 2. While the embodiment of FIG. 2 can be moulded in one annular piece, the embodiment of FIG. 3 is moulded in two pieces. However, the embodiment of FIG. 3 allows complicated surfaces of the members 110, 114, 116, 118 and facilitates the assembly of the parallelogram with further parts such as the hook 12, the spring 126, the thrower unit 120, the anchoring piece 130, the supporting piece 132, and further facilitates the attachment of the core wire 128a.

Figure 4:
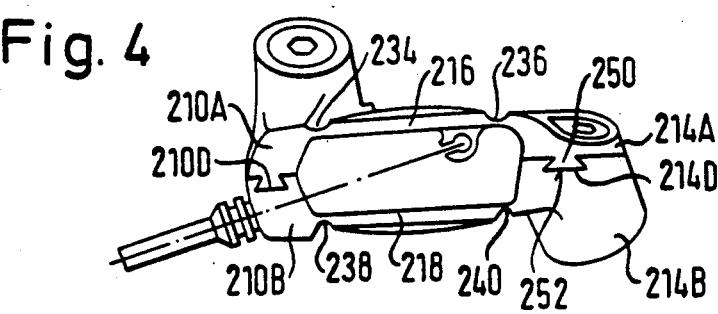
FIG. 4 shows a further modified embodiment as compared with FIG. 2.
Figure 8:
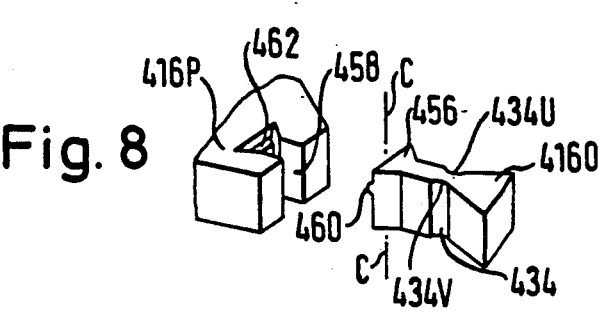
FIG. 8 shows a rigid closure between adjacent parts of a constructional member of a quadrangle located adjacent a plastics film hinge.

In the embodiment of FIG. 4 the half terminal members 210A,210B and 214A,214B are fastened to each other by dovetail engagement at 210D and 214D. Such the component assemblies 210A,216,214A and 210B,218,214B can be moulded as separate integral units and thereafter be combined by engagement of dovetail ribs 250 and dovetail grooves 252. The dovetail ribs 250 and the dovetail grooves 252 can be secured with respect to each other along their common axis by adhesive or by welding or by similar securing means as shown in FIG. 8 which will be described below. The plastic film hinges 234,236,238,240 are of the same design as shown in FIG. 7.

Figure 5:
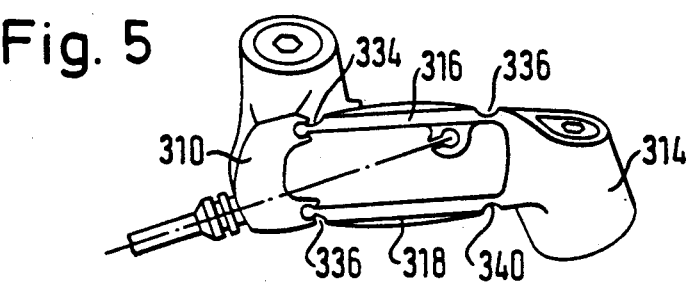
FIG. 5 shows a still further modified embodiment as compared with FIG. 2.
Figure 6:
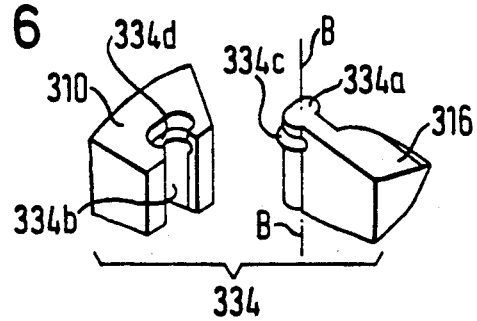
FIG. 6 shows a composed joint for use in an embodiment according to FIG. 5.

In the embodiment of FIG. 5 a first component assembly consists of the thrower side terminal member 314 and the connecting members 316 and 318 which are connected by plastic film hinges 336 and 340. The connecting members 316,318 are connected with the frame side terminal member 310 by composed joints 334 and 336. The composed joint 334 is shown in detail in FIG. 6. This hinge 334 comprises a partial cylindrical rib 334a of the connecting member 316 and a partial cylindrical groove 334b of the terminal member 310. The rib 334a is inserted into the groove 334b along the joint axis B—B. For securing the rib 334a and the groove 334b with respect to each other along the joint axis B—B, the rib 334a is provided with a annular projection 334c and the groove 334b is provided with an annular recess 334d, both said projection 334c and said recess 334d extending about the axis B—B. When inserting the rib 334a into the groove 334b the projection 334c snaps into the recess 334d such as to prevent axial relative movement of the members 310,316 but to allow a rotation of the members 310,316 with respect to each other about the joint axis B—B.

Such the parallelogram of FIG. 5 can be obtained by integrally moulding the component assembly 316,314,318 and hereupon combining this component assembly with the terminal member 310.

FIG. 8 shows a modification which may be applied, for example, to the embodiment of FIG. 2, where the connecting member 16 may be separated at location S into two partial members 416O and 416P. These partial members may be connected with each other by a dovetail rib 456 and a dovetail groove 458. This dovetail connection is close to a plastic film joint 334. It is to be noted that the rib 456 and the groove 458 may be secured with respect to each other along the axis C—C by a projection 460 and a recess 462 which snappingly engage each other when the rib 456 is inserted into the groove 458 along the axis C—C. Such the parallelogram of FIG. 2 can be moulded in one piece open at the location S and thereupon closed at the location S by engaging the rib 456 and the groove 462. This again facilitates for example the attachment of the core wire 28a to the anchoring piece 30 while maintaining a most simple possibility of manufacturing of the parallelogram by integral moulding.

One can see from FIG. 3 that the leaf spring 126 can be fastened between the partial members 110A and 110B. It is also possible to integrally form the leaf spring 126 with one of the members of a respective parallelogram. Further it is possible to provide in one of the members a mounting socket for inserting a leaf spring.

While the embodiment of FIG. 2 is most easily to be moulded, the open-ring embodiments of FIG. 3,4,5 and 8 offer the advantage of easily moulding more complicated faces of the respective terminal members and connecting members. Further the integral or non-integral fastening of auxiliary elements like the element 30 or the element 32 is facilitated. The plastic film hinge 334 is characterized in that it is formed by mutually opposed weakening grooves 434U and 434V. Such a most flexible plastic film hinge is obtained with reduced resistance against relative pivoting in both pivotal directions. In both embodiments of the plastic film hinge as shown in FIG. 7 and FIG. 8, the area of the plastic film hinge may be reinforced by embedded carbon or glass fibres which may be applied either as mats or chopped fibres.

It is easily to be understood that in all embodiments different members of the parallelogram may be moulded in different colours according to the request of the customer.

The reference numerals in the claims are only used for facilitating the understanding and are by no means restrictive.

I claim:

1. A chain thrower mechanism for gear change in a bicycle, said chain thrower mechanism comprising two terminal members (10,14), namely a frame side terminal member (10) adapted to be fastened on a bicycle frame and a thrower side terminal member (14) adapted to be assembled with a chain thrower unit (20) and further comprising at least one connecting member (16,18) hingedly connected with both said terminal members (10,14) for guiding said thrower side terminal member (14) along a predetermined path (24) with respect to said frame side terminal member (10), said chain thrower unit (20) being adapted for engagement with a bicycle chain and for dislocating said bicycle chain between at least two chain sprockets in response to movement of said thrower side terminal member (14) along said predetermined path (24), at least one articulated component assembly (10,16) of said chain thrower mechanism comprising at least two components (10,16), one of said at least two components (10,16) being at least a part of one (10) of said terminal members (10,14) and another one (16) of said at least two components (10,16) being at least a part (16) of a connecting member (16), said at least two components (10,16) being articulated with respect to each other by a joint having a joint axis (B—B), said at least two components (10,16) being moulded from a plastics material, said at least two components (10,16) being integrally moulded from said plastics material, said joint (34) being formed as a weakened portion of plastics material interconnecting said two components (10,16).

2. A chain thrower mechanism as set forth in claim 1, said at least one articulated component assembly (10,16) being moulded from thermoplastic material.

3. A chain thrower mechanism as set forth in claim 1, said at least one articulated component assembly (10,16) being injection moulded.

4. A chain thrower mechanism as set forth in claim 1, said at least one joint (34) being shaped as a plastic film hinge.

5. A chain thrower mechanism as set forth in claim 1, said weakened portion (34) being secured against tearing by at least one moulded-in stress-relief radius (r).

6. A chain thrower mechanism as set forth in claim 1, said at least one articulated component assembly (10,16) being reinforced at least in an area adjacent said weakened portion (34) by reinforcement fibres embedded in said plastics material.

7. A chain thrower mechanism as set forth in claim 6, said reinforcement fibres being selected from the group of carbon fibres and glass fibres.

8. A chain thrower mechanism as set forth in claim 6, said reinforcement fibres being present in the form of a fibre mat.

9. A chain thrower mechanism as set forth in claim 6, said reinforcement fibres being chopped fibre sections.

10. A chain thrower mechanism as set forth in claim 1, at least one component (10,16) of said at least one articulated component assembly (10,16) being integrally moulded with an auxiliary element (30,32).

11. A chain thrower mechanism as set forth in claim 10, said auxiliary element (30,32) being an element of the group of elements comprising a Bowden-wire anchoring element (30), a Bowden-tube support element (32), a spring element (26) and a fixing element for fixing a spring element.

12. A chain thrower mechanism as set forth in claim 1, said at least two components of said at least one articulated component assembly (10,16) being made of differently coloured plastics materials.

13. A chain thrower mechanism as set forth in claim 1, said terminal members (10,14) and two connecting members (116,118) forming a quadrangle (34,36,38,40).

14. A chain thrower mechanism as set forth in claim 13, said quadrangle (34,36,38,40) being approximately a parallelogram.

15. A chain thrower mechanism as set forth in claim 13, more than two joints (34,36,38,40) of said quadrangle being shaped as weakened portions interconnecting mutually adjacent members (10,16,14,18) of said quadrangle.

16. A chain thrower mechanism as set forth in claim 15, all four joints (34,36,38,40) of said quadrangle being shaped as weakened portions between mutually adjacent respective members of said terminal members and said connecting members.

17. A chain thrower mechanism as set forth in claim 16, said quadrangle (34,36,38,40) being integrally shaped as a closed annulus.

18. A chain thrower mechanism as set forth in claim 15, said terminal members (10,14) and said connecting members (16,18) of said quadrangle being integrally coherently shaped, said quadrangle being closed by closure means (S).

19. A chain thrower mechanism as set forth in claim 18, said closure means (S) being substantially rigid closure means (456,458) provided between adjacent partial members (416O,416P) of one member (16) of said terminal members (10,14) and said interconnecting members (16,18).

20. A chain thrower mechanism as set forth in claim 19, said substantially rigid closure means (S) being provided adjacent a respective joint (434) formed by a weakened portion.

21. A chain thrower mechanism as set forth in claim 18, said closure means (334) being articulated closure means provided by a composed joint (334), said composed joint being composed of interengaging hinge portions (334a,334b) of adjacent members (316,310).

22. A chain thrower mechanism as set forth in claim 13, three mutually adjacent members (316,314,318) of said terminal members (310,314) and said connecting members (316,318) of said quadrangle being integrally coherently shaped with two weakening portions (336,340) therebetween, a fourth one (310) of said members being connected with two members (316,318) of said three members (316,314,318) by two composed joints (334,336), each of said composed joints (334,336) being composed of mutually engaging hinge portions (334a,334b) of respective adjacent members (3116,310).

23. A chain thrower mechanism as set forth in claim 22, said three integrally, coherently shaped members (316,314,318) comprising one (314) of said terminal members and two connecting members (316,318), said fourth member (310) being one further terminal member.

24. A chain thrower mechanism as set forth in claim 13, said quadrangle comprising two articulated component assemblies (210A,216,214A;210B,218,214B), each of said articulated component assemblies comprising one complete member (216,218) of said terminal members and said connecting members and two adjacent partial members (210A,214A;210B, 214B) of said terminal members and said connecting members, respective partial members (210A,210B;214A,214B) of said two articulated component assemblies (210A,216,214A;210B,218, 214B) being interconnected with each other by substantially rigid closure means (250,252).

25. A chain thrower mechanism as set forth in one of claims 19 and 24, said substantially rigid closure means being one of a welded and an adhesively bonded closure means.

26. A chain thrower mechanism as set forth in claim 25, said substantially rigid closure means being ultrasonic welded closure means.

27. A chain thrower mechanism as set forth in one of claims 19 and 24, said substantially rigid closure means being provided by interengaging complementary closure portions (250,252) of respective interconnected partial members of one of said terminal members and said connecting members.

28. A chain thrower mechanism as set forth in claim 27, said complementary closure portions (250,252) being dovetail-shaped closure portions (250,252).

29. A chain thrower mechanism as set forth in claim 28, said dovetail-shaped closure portions (456,458) being secured against axial movement along a common axis (C—C) thereof.

30. A chain thrower mechanism as set forth in claim 29, said dovetail-shaped closure portions (456,458) being secured against relative movement along a common axis (C—C) thereof by snappingly engaging complementary securing faces (460, 462).

31. A chain thrower mechanism as set forth in claim 1, at least one of said joints being a composed joint (334) provided by mutually engaged hinge portions (334a,334b) of two mutually adjacent members (310,316) of said terminal members and said interconnecting members.

32. A chain thrower mechanism as set forth in claim 31, one (334b) of said mutually engaged hinge portions (334a, 334b) being a partially cylindrical groove (334b) extending along a respective joint axis (B—B) and the other one (334a) of said mutually engaged hinge portions (334a,334b) being a partially cylindrical rib (334a) extending along said respective joint axis and engaged with said partially cylindrical groove (334b).

33. A chain thrower mechanism as set forth in claim 32, said rib (334a) and said groove (334b) being secured with respect to each other along said joint axis (B—B).

34. A chain thrower mechanism as set forth in claim 33, said groove (334b) and said rib (334a) being secured with respect to each other along said joint axis (B—B) by mutually engaged annular complementary securing faces (334d,334c) provided in said groove (334b) and on said rib (334a), respectively and extending around said joint axis (B—B).

35. A chain thrower mechanism as set forth in one of claims 19 and 24,
an auxiliary element (126) being positioned adjacent respective closure means (110C) by mutually interconnected partial members (110A,110B) of one member of said group of terminal members and interconnecting members.

36. A chain thrower mechanism as set forth in claim 35, said auxiliary element (126) being a spring member (126).

* * * * *